US006205506B1

(12) United States Patent
Richardson

(10) Patent No.: US 6,205,506 B1
(45) Date of Patent: *Mar. 20, 2001

(54) BUS INTERFACE UNIT HAVING MULTIPURPOSE TRANSACTION BUFFER

(75) Inventor: Nicholas J. Richardson, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/139,555

(22) Filed: Aug. 25, 1998

(51) Int. Cl.$^7$ ...................................................... G06F 13/42
(52) U.S. Cl. ........................... 710/129; 710/130; 710/131
(58) Field of Search ..................................... 710/100, 101, 710/104, 105, 107, 108, 109, 110, 112, 113, 114, 127, 129, 130, 131

(56) References Cited

U.S. PATENT DOCUMENTS

| | | | |
|---|---|---|---|
| 5,185,869 | * | 2/1993 | Suzuki .................................. 395/375 |
| 5,526,495 | * | 6/1996 | Shibata et al. ........................ 395/307 |
| 5,737,566 | * | 4/1998 | Sparks et al. .......................... 395/427 |
| 5,778,431 | * | 7/1998 | Rahman et al. ....................... 711/135 |

* cited by examiner

Primary Examiner—Ayaz R. Sheikh
Assistant Examiner—Tim Vo
(74) Attorney, Agent, or Firm—Stephen Bongini; Theodore E. Galanthay; Lisa K. Jorgenson

(57) ABSTRACT

A bus interface unit includes multiple pointer queues coupled to a random-access transaction buffer. The transaction buffer stores address and data information for each requested bus transaction, and the pointer queues store pointers to the transaction information stored in the transaction buffer. The bus interface unit uses the pointers to order the transactions stored in the random-access transaction buffer. In one preferred embodiment, one pointer queue is used to store pointers for order dependent transactions, and another pointer queue is used to store pointers for non-order dependent transactions. In some embodiments, when an issued transaction is deferred by its target, the deferred transaction's information is maintained in the transaction buffer. Additionally, a method is provided for storing address, data, and ordering information for requested bus transactions. The address and data information for requested transactions is stored as entries in a random-access buffer. Additionally, pointers to the entries in the random-access buffer are formed, and the ordering information for the bus transactions is stored by maintaining the pointers in ordered buffers. In a preferred method, pointers for order dependent transactions are maintained in one ordered buffer, and pointers for non-order dependent transactions are maintained in another ordered buffer.

25 Claims, 4 Drawing Sheets

BUS INTERFACE UNIT HAVING MULTIPURPOSE TRANSACTION BUFFER

CROSS-REFERENCE TO RELATED APPLICATIONS

The present application is related to the inventor's applications "BUS INTERFACE UNIT HAVING DUAL PURPOSE TRANSACTION BUFFER" and "COMPUTER SYSTEM HAVING NON-BLOCKING CACHE AND PIPELINED BUS INTERFACE UNIT", which were filed on the same day as the present application. These related applications are herein incorporated by reference.

FIELD OF THE INVENTION

The present invention relates to a bus interface unit for a computer system, and more specifically to a pipelined bus interface unit for use in a computer system having an out-of-order processing unit and a non-blocking cache.

BACKGROUND OF THE INVENTION

A typical conventional computer system includes a central processing unit ("CPU"), a cache subsystem, and a bus interface unit ("BIU"). During operation, a read or write request from the CPU is first sent to the cache. If the cache contains the target data (i.e., on a cache hit), the cache directly services the request. Conversely, if the cache does not contain the target data (i.e., on a cache miss) or if the request is directed to an uncacheable memory address or an input/output ("I/O") address, the cache passes the request on to the BIU. When the BIU receives a read or write request, the request is submitted to the external memory or I/O systems using a predefined bus protocol, and any results are returned back to the cache and CPU (via the cache). Additionally, the cache services snoop requests from external agents such as other processors in order to perform cache-coherency operations.

One bus protocol used in modern computer systems is the Pentium® II bus protocol as defined in Volume 1 of the Pentium Pro Family Developer's Manual, which is published by Intel Corporation (Santa Clara, Calif.) and is herein incorporated by reference. In accordance with this protocol, the BIU communicates with the memory and I/O systems using several different read and write request transactions including: bus read line ("BRL"), bus read and invalidate line ("BRIL"), bus invalidate line ("BIL"), bus write line ("BWL"), bus read partial ("BRP"), bus write partial ("BWP"), I/O read ("IOR"), I/O write ("IOW"), and implicit write-back ("IWB"). Further, the BIU manages interrupted transactions that include deferred and retried transactions. A brief description of each of these transactions will now be given.

A bus read line transaction is requested when a new line is to be loaded into the cache. When a CPU read from a cacheable address misses the cache, the cache issues a BRL transaction to the BIU. In response, the BIU makes a read request to main memory for the number of bytes required to fill a cache line (e.g., 32 bytes). Because the CPU can process read transactions speculatively and out-of-order, BRLs do not have any ordering requirements either with respect to each other or with respect to other types of bus transactions.

A bus read and invalidate line transaction is initiated when a CPU write transaction to a cacheable address misses the cache. Like a BRL, a BRIL causes the BIU to read a line from external memory. Additionally, the addressed line is invalidated in all other caches (for external agents in the system) in which the line resides. Although in conventional systems memory writes must generally be kept in order, a BRIL does not directly influence the ordering of the CPU write transaction from which it was generated. Thus, BRILs do not have any ordering requirements either with respect to each other or with respect to other types of bus transactions. Similarly, a bus invalidate line transaction is initiated when a CPU write to a cacheable address hits a shared line in the cache. Such a shared line must be changed to the exclusive state before it can be modified by the CPU. The BIL transaction is used to invalidate the addressed line in all other caches in which the line resides, without reading any data from the external memory. BILs also do not have any ordering requirements either with respect to each other or with respect to other types of bus transactions.

A bus write line transaction is generated when the cache writes a displaced cache line back to memory so that a new line can be loaded into the cache. A BWL is also generated when multiple CPU write transactions to uncacheable memory addresses are accumulated (i.e., write-combined) in the BIU. In a BWL, an entire line (e.g., 32 bytes) is written to the external memory. Like BRLs, BWLs do not have any ordering requirements either with respect to each other or with respect to other types of bus transactions.

The bus read partial and I/O read transactions are generated when the CPU issues a read transaction that is directed to an uncacheable memory address or an I/O address, respectively. When a BRP or an IOR is submitted to the bus by the BIU, one to eight bytes of data are read from the designated address. Similarly, the bus write partial I/O write transactions are generated when the CPU issues a write transaction to an uncacheable memory address or an I/O address. The BWP and IOW transactions cause one to eight bytes of data to be written to the designated address. While the BIU must issue BRPs, BWPs, IORs, and IOWs to the bus in the order in which they are received from the CPU, these types of transactions do not have any ordering requirements with respect to BRLs, BRILs, BILs, and BWLs.

A snoop implicit write-back transaction is generated when a transaction from an external agent "snoops" the cache and requires that modified lines matching the designated address be written back to main memory. While an IWB operates like a BWL, the Pentium® II bus protocol requires that the line of data for the IWB transaction be delivered as a result of the snooping transaction, rather than by newly generating an independent write transaction (thus, the "implicit" designation). That is, an IWB transaction is sent to the BIU by the cache as a result of an external snooping transaction that requests write-back of a modified cache line, instead of by a request originating from the CPU.

A "deferred" transaction is a transaction that is issued by the BIU and then suspended before completion. When a transaction will take a long time and thus block other transactions, a deferral may be ordered by the target of the transaction (e.g., external memory) in order to free the bus for other transactions. Then, when the target is ready to service the transaction that was deferred, the target issues a "Deferred Reply" in order to continue with the execution of the original transaction. Under the Pentium® II bus protocol, BRLs, BRILs, BILs, BRPs, and BWPs may be deferred by their targets. A "retried" transaction is a transaction that is aborted by its target (e.g., external memory) before the transaction is completed to free the bus for other transactions. The aborted transaction is later reissued to the bus (i.e., retried) by the CPU. All of the transactions types may be retried.

When the BIU receives a read or write request, the transaction is buffered in the BIU. More specifically, the BIU consolidates and orders the received transactions, and then issues the transactions on the bus so as to increase the efficiency (i.e., throughput) of the bus. For example, in the BIU of a typical computer system, all cacheable, line-oriented transactions (BRLs, BRILs, BILs, and BWLs) are placed in a single cacheable request queue ("CRQ") and then issued to the bus at the maximum rate allowed (as defined by the bus protocol). While issuing such transactions at the maximum rate may result in reordering on the bus via the "retry" and "defer" mechanisms, this does not present a problem because the cacheable, line-oriented transaction types are not order dependent (i.e., they can be sent to the bus and their results returned to the CPU in any order).

Further, all uncacheable, byte-oriented transactions (BRPs, BWPs, IORs, and IOWs) are placed in a second buffer, which is known as the uncacheable request queue ("UCRQ"). Because the uncacheable transaction types must be maintained in the order received with respect to each other, these types of transactions are buffered in the separate UCRQ and then issued to the bus at a lower rate than the cacheable transactions to prevent reordering. However, because they do not have to be ordered with respect to cacheable transactions, the uncacheable transactions can be interspersed with cacheable transactions to increase the throughput of the bus. A third buffer, which is known as the snoop status queue ("SSQ"), is used to buffer all implicit write-backs transactions. Because snooping transactions that generate IWBs cannot be reordered once issued on the bus, the buffered IWBs are submitted to the bus in the order in which the IWB-generating transactions were received by the BIU.

After a transaction is issued to the bus, the transaction is removed from the CRQ or UCRQ and stored in an uncompleted transaction buffer, which is known as the in-order queue ("IOQ"). The contents of the IOQ are used to track active transactions through their various phases. Whenever an active transaction is deferred by its target, the transaction is considered temporarily completed. Thus, the deferred transaction is removed from the IOQ and placed in a deferred transaction buffer, which is random-access so that when a Deferred Reply is received the corresponding transaction can be reactivated. Similarly, whenever an active transaction is retried (i.e., aborted) by its target, the transaction is removed from the IOQ and placed in a retry buffer, which is known as the retried request queue (RTRQ). The retried transactions in the RTRQ are later reissued to the bus.

When a transaction issued by the BIU is completed, it is removed from the IOQ. Additionally, when certain transactions are completed (e.g., BRLs, BRILs, BILs, BRPs, and BWPs), the BIU must notify the cache (and CPU) that the requested data is available and/or that the next order-dependent operation can be scheduled. Therefore, completed transactions of these types are both removed from the IOQ and placed in another buffer, which is known as the completion status queue (CSQ), on removal from the IOQ. The completed transactions are consecutively submitted to the cache (and CPU) in the order of their completion.

While the conventional bus interface unit described above can manage data transfer between the processor's cache and the external systems, several drawbacks are presented. First, each buffer in the conventional BIU holds the address, data, and control information for every stored transaction. Therefore, if completely separate buffers (i.e., CRQ, UCRQ, SSQ, etc.) are used for each of the transaction classes, each buffer must necessarily be limited to a small number of entries to keep the chip area reasonable. Such low capacity buffers degrade the performance of the system under heavy loading conditions. Additionally, the study of typical program behavior has indicated that it is rare for many transactions of different classes to be active at the same time. In other words, transactions falling into a single transaction class usually predominate at a given point in program execution. Thus, if the number of entries in each of the buffers is increased to improve the overall performance of the system, then the high capacity of the buffers would be heavily underutilized most of the time.

Further, when a transaction of a deferrable transaction type is issued, the BIU cannot know whether or not it will be deferred. Thus, such a transaction cannot be issued until space for it has been allocated in the deferred transaction buffer. When a deferrable transaction is held up due to a full deferred transaction buffer, system performance is degraded. Additionally, the BIU of a modern computer system must be able to concurrently process many different types of transactions, and each type of transaction has its own special control requirements. Therefore, extremely complex circuitry is required to control data flow in a BIU having separate buffers that each contain the address, data, and control information for a large number of transactions.

SUMMARY OF THE INVENTION

In view of these drawbacks, it is an object of the present invention to remove the above-mentioned drawbacks and to provide a pipelined bus interface unit that efficiently increases the performance of the computer system without a significant increase in cost or complexity. The bus interface unit includes a single random-access transaction buffer that stores the address, data, and control information for all transaction types. For each transaction class, ordering information for all pending transactions is held in a separate queue that contains pointers to the corresponding informational entries in the transaction buffer. Because the pointer queues store only pointers to the corresponding transaction buffer entries, each pointer queue can be made to have a large number of entries (e.g., the same number of entries as there are in the transaction buffer) without significantly increasing the chip area. Thus, the bus interface unit can efficiently handle a relatively large number of same-type transactions at a reduced cost.

It is another object of the present invention to provide a bus interface unit that can issue deferrable transactions without special restrictions. When a transaction is deferred by its target, the bus interface unit removes the corresponding pointer from the active transaction queue but does not remove the transaction information from the transaction buffer. This deferral-in-place procedure eliminates the need for a deferred transaction buffer, and thus also eliminates any special restrictions on the issuance of deferrable transactions.

It is yet another object of the present invention to provide a bus interface unit having simplified control logic. The single multipurpose transaction buffer stores the address and control information for all transactions, so a single set of address comparators and collision-detection logic can be used to detect all possible transaction collisions. Therefore, the complexity of the control logic is reduced.

According to a first embodiment of the present invention, a bus interface unit is provided that includes multiple pointer queues that are coupled to a random-access transaction buffer. The transaction buffer stores an address and data information entry for each requested bus transaction, and each pointer queue stores pointers to the individual informational entries stored in the transaction buffer. The bus interface unit uses the pointers stored in the pointer queues to order the transactions stored in the random-access transaction buffer. In one preferred embodiment, one FIFO pointer queue is used to store pointers for transactions that are order dependent, and another FIFO pointer queue is used to store pointers for transactions that are non-order dependent.

According to a second embodiment of the present invention, a bus interface unit is provided that includes first and second pointer queues that are coupled to a random-access transaction buffer. The transaction buffer stores address and data information entries for bus transactions that are requested by a cache. The first pointer queue stores pointers to the entries in the transaction buffer for transactions of a first transaction type, and the second pointer queue stores pointers to the entries in the transaction buffer for transactions of a second transaction type. The bus interface unit uses the pointers stored in the first and second pointer queues to order the transactions stored in the random-access transaction buffer. In a preferred embodiment, when a transaction that has been issued by the bus interface unit is deferred by its target, the deferred transaction's entry in the transaction buffer is maintained.

A third embodiment of the present invention provides a method of storing the address, data, and ordering information for requested bus transactions in a computer system. According to the method, the address and data information for requested bus transactions is stored as entries in a random-access buffer. Additionally, pointers to the entries in the random-access buffer are formed, and the ordering information for the bus transactions is stored by maintaining the pointers in ordered buffers. In one preferred method, pointers for order dependent transactions are maintained in one FIFO-ordered buffer, and pointers for non-order dependent transactions are maintained in another FIFO-ordered buffer.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 4:
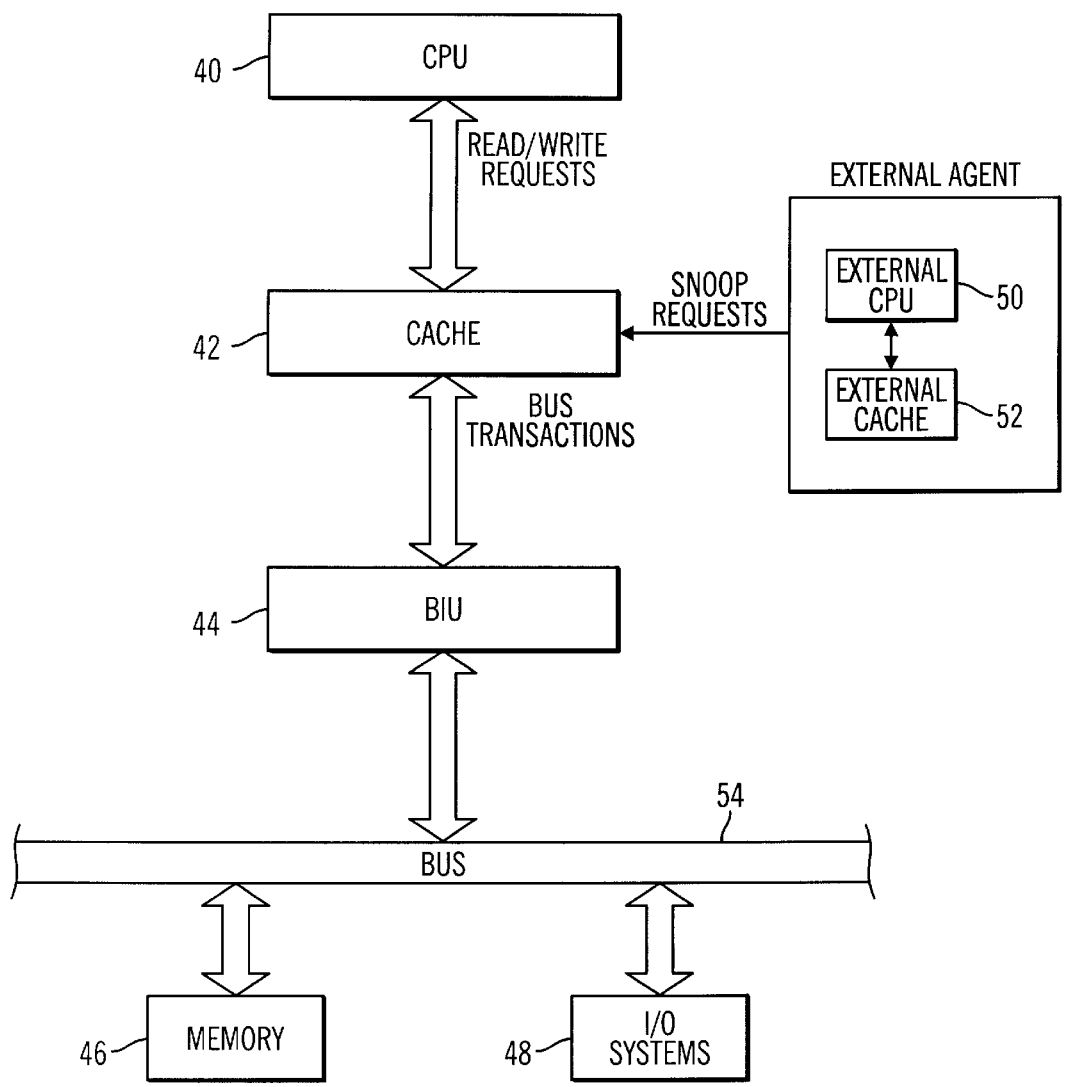
FIG. 4 is a block diagram of essential portions of a computer system that includes a bus interface unit.

In a computer system, a non-blocking cache subsystem 42 is connected between an out-of-order processing unit ("CPU") 40 and a pipelined bus interface unit ("BIU") 44, as shown in FIG. 4. The BIU 44 is also connected to the system bus 54, along with external memory 46 and various I/O systems 48. In some systems, external agents (such as external CPU 50 and its cache 52) are also coupled to the cache 42. In preferred embodiments, the system bus operates in accordance with the Pentium® II bus protocol described above.

Figure 1:
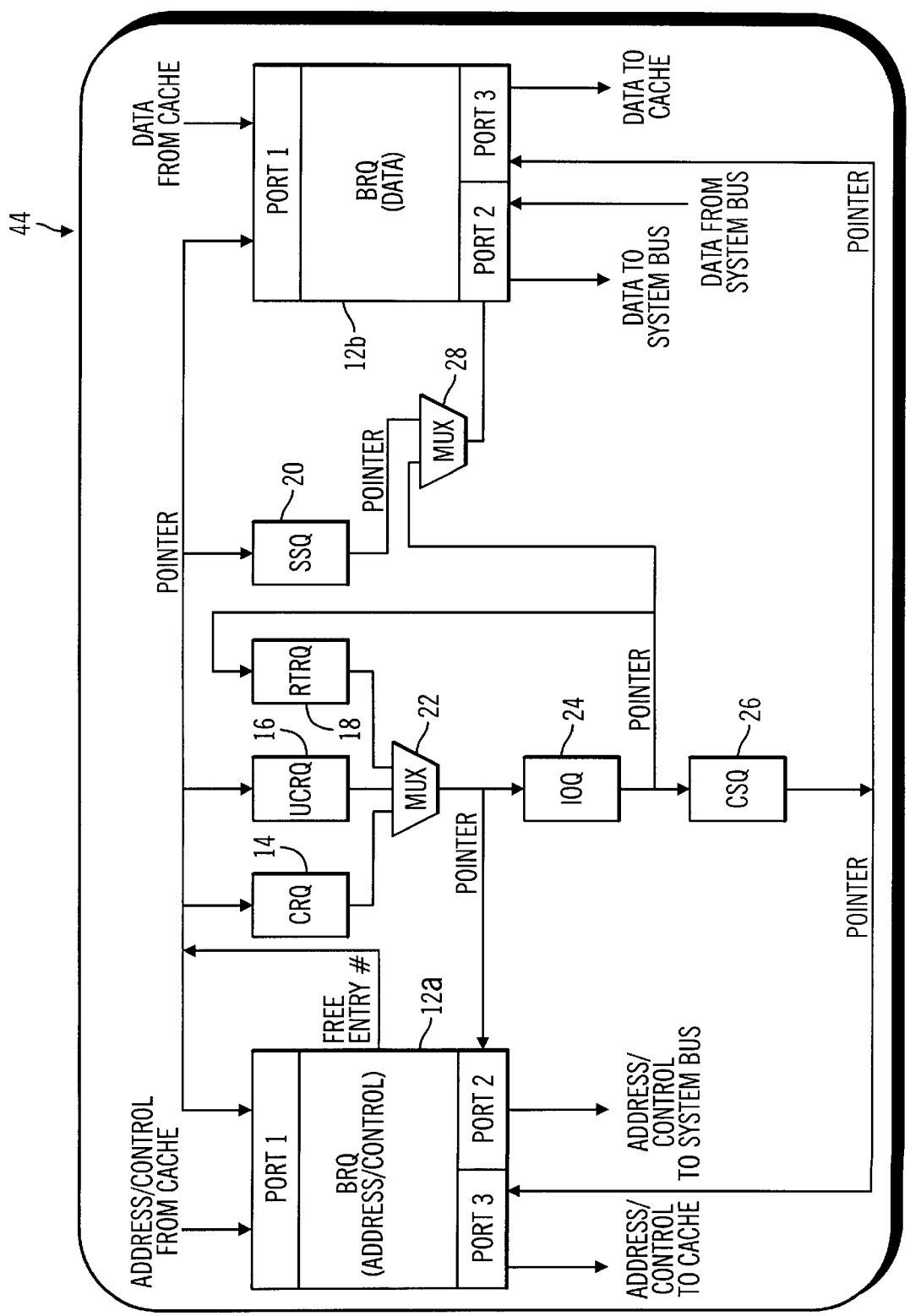
FIG. 1 is a block diagram of a bus interface unit according to a preferred embodiment of the present invention.

FIG. 1 shows in detail the BIU 44 of such a computer system according to a preferred embodiment of the present invention. As shown, a single, common random-access buffer, which is known as the bus request queue ("BRQ") 12, receives the address, control, and data information for all memory and I/O transactions requested by the cache. Each entry in the BRQ contains a field for storing the transaction address and other control information, and a field for storing any transaction data (e.g., up to one line, or 32 bytes, of data). In the embodiment shown, the address/control portion 12a of the BRQ and the data portion 12b of the BRQ are implemented as separate structures because such portions are accessed at different times during the course of a bus transaction due to the pipelined nature of the Pentium® II bus protocol.

More specifically, the address/control portion 12a and the data portion 12b hold the same number of entries (e.g., 16) and are closely coupled. The address/control portion 12a of the BRQ has three I/O ports that can be used to independently and simultaneously access the address/control information for any three BRQ entries. Port 1 receives address and control information for requested transactions from the cache, Port 2 is used to issue transactions to the system bus, and Port 3 is used to return the address and control information of completed transactions to the cache for further processing. Similarly, the data portion 12b of the BRQ also has three ports that can be used to independently and simultaneously access the data information for any three BRQ entries. Port 1 receives the data for requested write transactions from the cache, Port 2 is used to submit write data to the system bus or to receive read data from the system bus, and Port 3 is used to return read data to the cache for further processing.

In addition to the common BRQ that stores a collection of randomly-accessible entries, the BIU includes pointer queues for storing information about the order in which transactions should be sent to the system bus 54 and returned to the cache 42, and information determining the number of transactions outstanding for each transaction class. In the embodiment shown, six first-in, first-out (FIFO) queues (namely, CRQ 14, UCRQ 16, RTRQ 18, SSQ 20, IOQ 24, and CSQ 26) are used to store ordering information for the transactions stored in the BRQ 12. In particular, each entry in a pointer queue consists of a pointer to one of the entries in the random-access BRQ.

Figure 2:
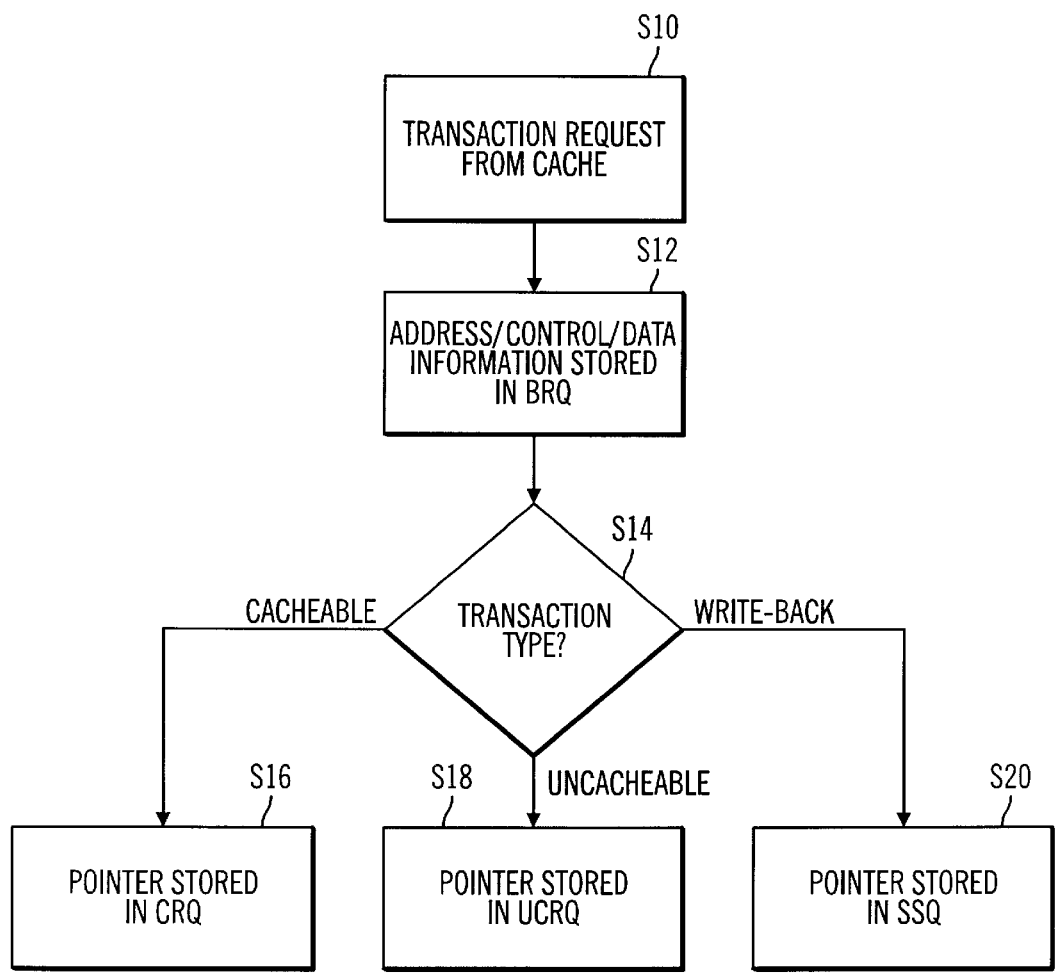
FIG. 2 is a flow chart of the transaction storing process used in the bus interface unit of FIG. 1.
Figure 3:
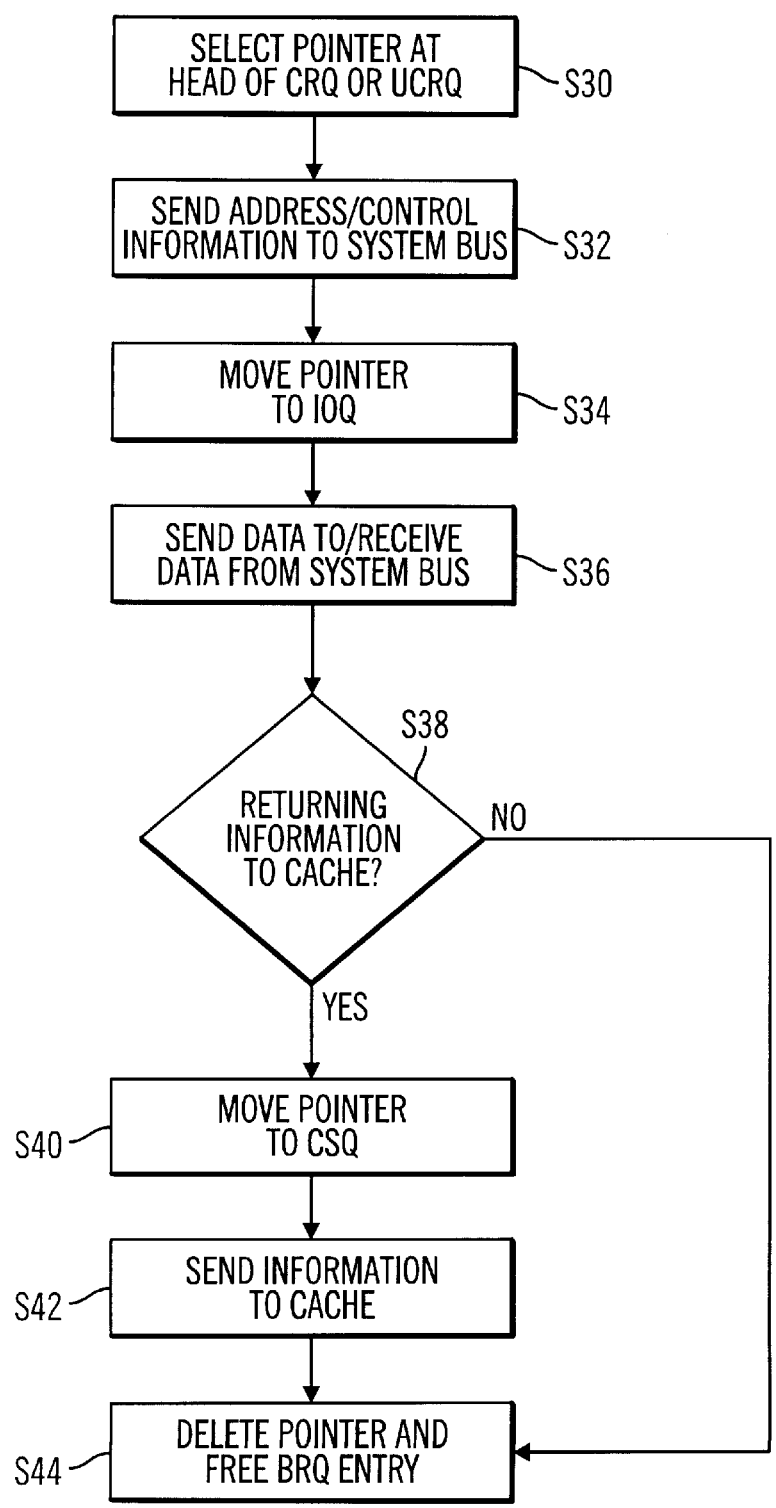
FIG. 3 is a flow chart for transaction execution in the bus interface unit of FIG. 1.

The operation of the BIU of the preferred embodiment will now be explained with reference to the flowcharts of FIGS. 2 and 3. When the cache 42 sends a new transaction request (S10), the address, control, and any data information for the transaction are loaded into an empty slot in the BRQ 12 via Port 1 (S12). The BIU determines if the new transaction is of the cacheable, uncacheable, or write-back class (S14), and places a pointer to the transaction's BRQ entry into the appropriate FIFO queue (S16, S18, or S20). That is, pointers to transactions in the cacheable, uncacheable, and write-back classes are placed in the cacheable request queue (CRQ), the uncacheable request queue (UCRQ) 16, and the snoop status queue (SSQ) 20, respectively.

When a transaction pointer reaches the head of the CRQ or UCRQ and the BIU is ready to generate a new bus request, then the output of the CRQ or UCRQ is selected via a first multiplexer 22 according to an efficiency-based priority scheme (S30). For example, if the next UCRQ transaction is stalled because the previous in-order UCRQ transaction has not been completed, then the next non-order dependent CRQ transaction would be selected. The pointer at the head of the selected queue is then coupled to Port 2 of the address/control portion of the BRQ 12a so that the address and control information for the selected transaction can be sent to the system bus (S32). Because data is handled in a later phase of a bus transaction under the Pentium® II bus protocol, the data portion of the BRQ 12b is not accessed at this time.

The selected pointer is then moved from the appropriate request queue (CRQ or UCRQ) to the in-order queue (IOQ) to track the progress of the transaction on the bus (S34). Removing the pointer from the request queue makes the next pointer in the queue immediately accessible for generating the next pipelined bus request. When the pointer reaches the head of the IOQ and the system bus is ready to transmit or receive data, the pointer is coupled to Port 2 of the data portion of the BRQ 12b so that data can be supplied to the bus (for a write) or received from the bus (for a read) (S36).

Next, when the transaction is completed on the bus, the pointer is removed from the IOQ. If the transaction is of a type that does not require any information to be returned to the cache (S38), the pointer is then simply deleted and the corresponding BRQ entry is marked as empty in order to end the transaction (S44). On the other hand, if data or ordering information is to be returned to the cache, then the pointer is transferred to the completion status queue (CSQ) (S40). Then, when the pointer reaches the head of the CSQ and the cache is ready to process a completed transaction, the pointer is coupled to Port 3 of both portions of the BRQ (12a and 12b) so that the relevant information for the transaction can be transferred from the BRQ to the cache (S42). Finally, the pointer is removed from the CSQ and the corresponding BRQ entry is marked as empty in order to end the transaction (S44).

For an IWB transaction, the pointer to the appropriate BRQ entry is placed in the SSQ 20, as explained above. Then, when the pointer reaches the head of the SSQ and the external snooping transaction is ready to receive the writeback data, the pointer is coupled to Port 2 of the data portion of the BRQ 12b (through a second multiplexer 28) so that the data can be transmitted to the system bus. Notably, the CRQ 14 and UCRQ 16 are never used during an IWB transaction because the snooping transaction that causes generation of the IWB originates from an external agent.

The special handling of retried and deferred transactions in the BIU of the preferred embodiment will now be explained. When an active transaction is retried by its target, the corresponding pointer is moved from the IOQ to the retried request queue (RTRQ). Further, the BRQ entry for the transaction is kept valid in light of the fact that the same transaction must later be reissued. The RTRQ reissues retried transactions to the system bus in the order in which they were received. Once reissued, the progression of a retried transaction is the same as that described above for transactions from the CRQ and UCRQ.

Similarly, when an active transaction is deferred by its target, the corresponding pointer is removed them from the IOQ, and the BRQ entry for the transaction is kept valid. When the target generates a deferred reply, the transaction is reactivated based on information supplied by the deferred reply. Such information is used to identify the BRQ entry containing the previously-deferred transaction so that a transaction pointer can be placed back in the IOQ. With such handling, all relevant information for a deferred transaction is kept in place (i.e., in its original location in the BRQ), instead of being moved to a separate deferred transaction buffer. Thus, even though at issuance it is not known whether or not a deferrable transaction will be deferred, the BIU does not have to allocate space in a special buffer before issuing the transaction.

As previously explained, the present invention provides a bus interface unit that can efficiently handle a relatively large number of same-type transactions at a reduced cost. A common, random-access transaction buffer is used to store the necessary information for all bus transactions requested by the CPU or cache. Additionally, pointers to the individual entries in the transaction buffer are stored in queues, with separate queues being used to order pending transactions of different transaction classes. Because of this common buffer and multiple pointer queue structure, the number of buffer entries used for transactions in each pointer queue is completely dynamic. That is, each pointer queue can make use of from none to all of the entries in the transaction buffer. Thus, the BIU can easily adapt to the mix of active transactions that are presented at any time during program execution.

Further, in preferred embodiments of the present invention, the address/control and data portions of the common buffer are separated. Therefore, different transactions can independently access the two separated portions at the same time for more efficient processing of transactions in a pipelined bus cycle environment. Additionally, some embodiments of the present invention maintain deferred transactions in-place in the transaction buffer. This eliminates the requirement that space be allocated in a deferred transaction buffer before a deferrable transaction can be issued to the bus.

The embodiments of the present invention described above relate to a computer system having Pentium®-type processors and a system bus that operates in accordance with the Pentium® II bus protocol. However, the bus interface unit of the present invention could be implemented in a system that utilizes a different type of processor and/or a different bus protocol. Similarly, while the above embodiments are described in relation to a multiple processor computer system, single or multiple processor computer system having varying features and abilities could be implemented with the bus interface unit of the present invention. Additionally, other design choices, such as the computer system's architecture, the number of pointer queues and the use of each, the number of entries in the transaction buffer and each pointer queue, and the number and types of devices connected to the system bus could easily be adapted. Furthermore, embodiments of the present invention may not include all of the features described above. For example, the separate address and data portions and multiple access ports of the transaction buffer, the deferral-in-place mechanism, and the cache subsystem may not be included in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A bus interface unit for interfacing with a bus of a computer system having a plurality of bus transaction types, said bus interface unit comprising:
    a random-access transaction buffer that stores an informational entry for each requested bus transaction, the informational entries including address and data information; and
    a plurality of pointer queues coupled to the transaction buffer, each pointer queue selectively storing pointers to the individual informational entries stored in the transaction buffer,
    wherein each of the pointer queues stores pointers to the informational entries for requested bus transactions with transaction types that are a subset of all of the transaction types, and
    the pointers stored in the pointer queues are used to order the transactions stored in the transaction buffer.

2. The bus interface unit as defined in claim 1, wherein the portion of the transaction buffer that stores the address information is physically separated from the portion of the transaction buffer that stores the data information.

3. The bus interface unit as defined in claim 1, wherein at least one of the pointer queues has the same number of entries as the transaction buffer.

4. The bus interface unit as defined in claim 1, wherein the plurality of pointer queues includes one pointer queue that stores pointers for bus transactions that are order dependent, and another pointer queue that stores pointers for bus transactions that are non-order dependent.

5. The bus interface unit as defined in claim 1, wherein each of the pointer queues operates as a first-in, first-out buffer, and the output of one of the pointer queues is selected for issuing a transaction to the bus.

6. The bus interface unit as defined in claim 1, wherein when a transaction is issued to the bus and then deferred, the informational entry for the deferred transaction is maintained in the transaction buffer.

7. A computer system including the bus interface unit as defined in claim 1, said computer system further including:
    a processing unit;
    a cache subsystem coupled to the processing unit and the bus interface unit; and
    external memory coupled to the bus interface unit through the bus,
    wherein the cache subsystem sends requested bus transactions to the bus interface unit, and
    the bus interface unit selectively issues transactions to the bus in order to access the contents of the external memory.

8. The bus interface unit as defined in claim 1, wherein the plurality of pointer queues includes a first pointer queue that stores pointers for cacheable bus transactions, and a second pointer queue that stores pointers for uncacheable bus transactions.

9. The computer system as defined in claim 7, further comprising an external agent including at least an external processing unit, the external agent being coupled to the cache subsystem and being able to access the contents of the cache subsystem.

10. The bus interface unit as defined in claim 8, wherein the plurality of pointer queues includes a third pointer queue that stores pointers for retried bus transactions.

11. A bus interface unit for use in a computer system of the type having a cache, a system bus, and a plurality of types of bus transactions, said bus interface unit comprising:
    a random-access transaction buffer that stores informational entries for bus transactions that are requested by the cache, each informational entry including address and data information;
    a first pointer queue coupled to the transaction buffer, the first pointer queue storing a pointer to the informational entry of each bus transaction stored in the transaction buffer that is of a first transaction type; and
    a second pointer queue coupled to the transaction buffer, the second pointer queue storing a pointer to the informational entry of each bus transaction stored in the transaction buffer that is of a second transaction type, which is different than the first transaction type,
    wherein the pointers stored in the first and second pointer queues are used to order the bus transactions stored in the transaction buffer.

12. The bus interface unit as defined in claim 11, wherein the portion of the transaction buffer that stores the address information is physically separated from the portion of the transaction buffer that stores the data information.

13. The bus interface unit as defined in claim 11, wherein both the first pointer queue and the second pointer queue have the same number of entries as the transaction buffer.

14. The bus interface unit as defined in claim 11,
    wherein the bus interface unit is coupled between the cache and the system bus,
    each of the first and second pointer queues operates as a first-in, first-out buffer, and
    the output of one of the pointer queues is used to issue a transaction to the system bus.

15. The bus interface unit as defined in claim 11, wherein when a transaction is issued to the system bus and then deferred, the informational entry for the deferred transaction is maintained in the transaction buffer.

16. A computer system including the bus interface unit as defined in claim 11, said computer system further including:
    a processing unit coupled to the cache, the processing unit writing data to and reading data from the cache;
    an external processing unit coupled to the cache, the external processing unit being able to access the contents of the cache;
    external memory coupled to the bus interface unit through the system bus; and
    at least one I/O device coupled to the bus interface unit through the system bus,
    wherein the cache sends requested bus transactions of both the first and second transaction types to the bus interface unit, and
    the bus interface unit selectively issues transactions to the bus in order to access the contents of the external memory or I/O device.

17. The bus interface unit as defined in claim 11, wherein the first transaction type is cacheable bus transactions, and the second transaction type is uncacheable bus transactions.

18. The bus interface unit as defined in claim 17, further comprising:
    a third pointer queue coupled to the transaction buffer, the third pointer queue storing a pointer to the informational entry of each bus transaction stored in the transaction buffer that is of a third transaction type,
    wherein the third transaction type is retried bus transactions.

19. A method of storing address, data, and ordering information for requested bus transactions in a computer system having a plurality of bus transaction types, said method comprising the steps of:

storing the address and data information for requested bus transactions as entries in a random-access buffer;

forming a pointer to each of the information entries stored in the random-access buffer; and storing the ordering information for the bus transactions by maintaining each of the formed pointers in one of a plurality of pointer buffers such that each of the pointer buffers stores pointers to the informational entries for requested bus transactions with transaction types that are a subset of all of the transaction types.

20. The method as defined in claim 19, wherein the step of storing the address and data information includes the sub-steps of:

storing the address information in a first portion of the random-access buffer; and storing the data information in a second portion of the random-access buffer, the first portion being physically separated from the second portion.

21. The method as defined in claim 19, wherein for at least one of the pointer buffers, the maximum number of pointers that can be stored is the same as the maximum number of information entries that can be stored in the random-access buffer.

22. The method as defined in claim 19, wherein the step of storing the ordering information includes the sub-steps of:

maintaining pointers for bus transactions that are order dependent in one of the pointer buffers; and maintaining pointers for bus transactions that are non-order dependent in another of the pointer buffers.

23. The method as defined in claim 19, wherein each of the ordered buffers operates on a first-in, first-out basis.

24. The method as defined in claim 19, wherein the step of storing the ordering information includes the sub-steps of:

maintaining pointers for cacheable bus transactions in a first of the pointer buffers; and maintaining pointers for uncacheable bus transactions in a second of the pointer buffers.

25. The method as defined in claim 24, wherein the step of storing the ordering information further includes the sub-step of maintaining pointers for retried bus transactions in a third of the pointer buffers.

\* \* \* \* \*